Nov. 11, 1969  B. R. KELLER, SR  3,477,208
SHIELDED LIQUID ZONE GAS-LIQUID SEPARATOR
Filed Dec. 16, 1966  4 Sheets-Sheet 1

INVENTOR
BEN R. KELLER, SR.

Richards, Harris, & Hubbard
ATTORNEYS

Nov. 11, 1969  B. R. KELLER, SR  3,477,208
SHIELDED LIQUID ZONE GAS-LIQUID SEPARATOR
Filed Dec. 16, 1966  4 Sheets-Sheet 2

INVENTOR
BEN R. KELLER, SR.

Richards, Harris, & Hubbard
ATTORNEYS

Nov. 11, 1969   B. R. KELLER, SR   3,477,208
SHIELDED LIQUID ZONE GAS-LIQUID SEPARATOR
Filed Dec. 16, 1966   4 Sheets-Sheet 3

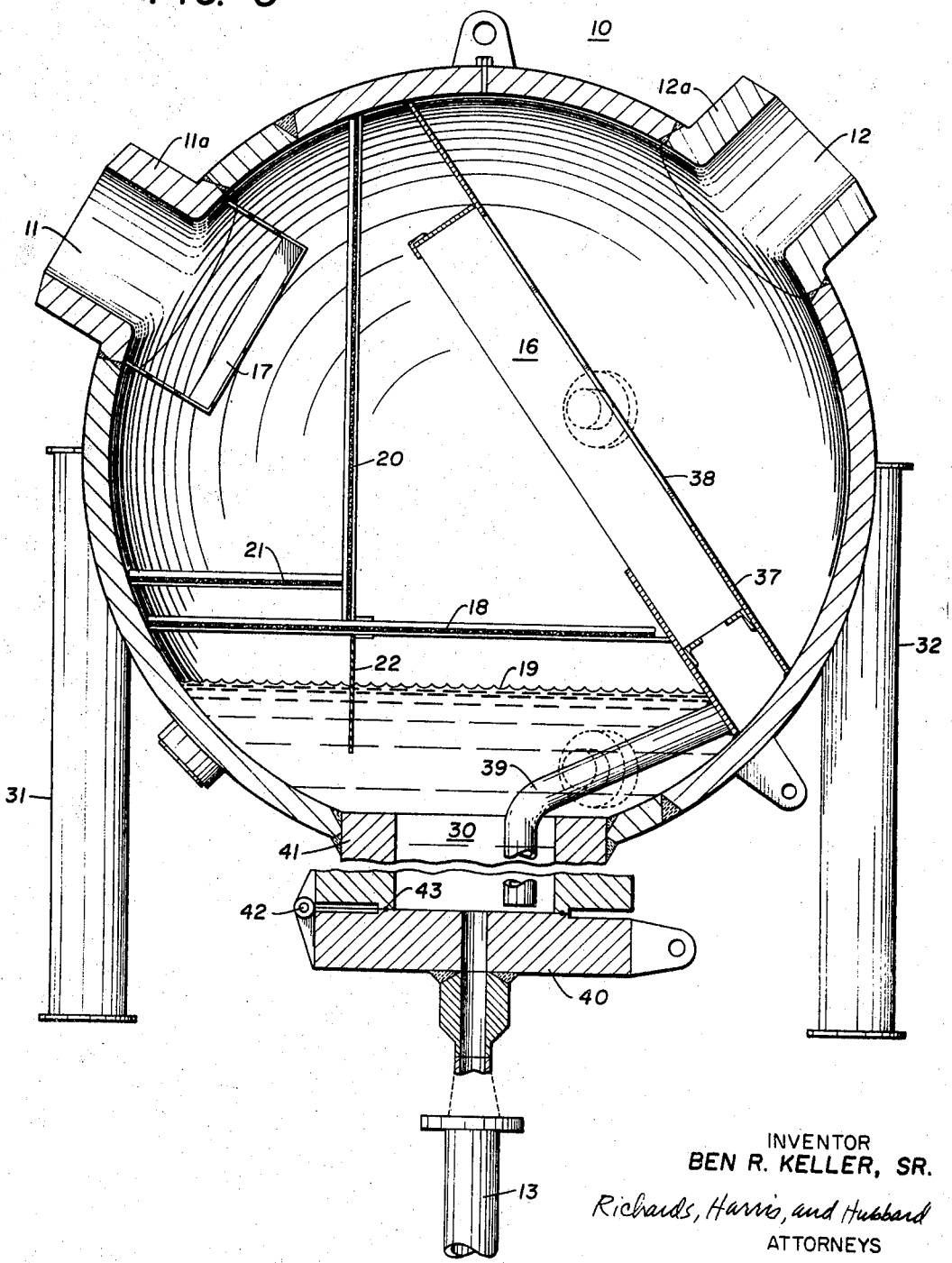

United States Patent Office 3,477,208
Patented Nov. 11, 1969

3,477,208
SHIELDED LIQUID ZONE GAS-LIQUID
SEPARATOR
Ben R. Keller, Sr., Mineral Wells, Tex.
(5221 Valerie, Bellaire, Tex. 77401)
Filed Dec. 16, 1966, Ser. No. 602,246
Int. Cl. B01d 19/00, 39/12, 45/06
U.S. Cl. 55—218                                    7 Claims

ABSTRACT OF THE DISCLOSURE

A gas-liquid separator characterized by the injection of pressurized gas with entrained liquid component into a spherical or cylindrically shaped pressure vessel to be deflected downwardly by a baffled deflector within the inlet, gas passing through a vertical screen with pressure drop resulting thereacross, while liquid components fall upon, and pass through that part of a horizontal screen below the deflector, the said horizontal screen extending completely across the pressure vessel and in all around abutment with imperforate wall means defining the liquid reservoir. Gas passing below the horizontal screen is deflected, by a baffle extending below the horizontal screen down into the liquid, to pass back up through the horizontal screen and on through the vertical screen to join with the gas in the area downstream from the vertical screen, while the horizontal screen completely presents any re-entrainment of the liquid with such downstream gas to be carried on to the outlet.

This invention is directed to gas-liquid separators and more particularly to a gas separator in which liquid condensate is shielded from forces produced by gas flow and in which gas flow through the unit is controlled in an optimum manner.

In operation of high pressure gas flow systems such as pipelines, gas process plants such as ammonia plants and the like, large quantities of condensate are present. It is highly desirable and often mandatory that such liquids be removed for optimum operation of process equipment such as the pressurizing systems and the like. It has been the practice to provide such systems with gas-liquid separators wherein the velocity of the gas stream is reduced so that the heavier entrained particles fall out of the stream before passing from the separator. The size and the mass of most of the entrained particles being known, and their reduced velocity being ascertainable, such separators have been designed so that their length or diameter is great enough that entrained particles fall out of the relatively slow moving gas stream. The disentrained particles condense to form a liquid condensate which accumulates within and is then drained from the separator.

In spite of care in design of such separators, it has been found that the effluent gas stream contains undesirable amounts of entrained particles. Gas entering a separator is generally deflected or changed in its course. It has been found that gas flow along the inner surface of the separator forms turbulence resulting in high velocity zones in which condensate standing in the separator is re-entrained. Such re-entrained particles in large part are carried from the separator by the effluent gas stream.

The velocity of gas particles at the periphery of the deflected inlet stream is less than the velocity of gas particles at the center of the stream. Since the entrained particles are more easily carried in the faster-moving center stream than in the slower-moving periphery of the stream, prior art separators have been designed with lengths or diameters sufficiently great to accommodate the longer travel of particles entrained at the stream center. Accordingly, prior art separators have been oversized and inefficient.

The present invention provides for an improved gas-liquid separator while maintaining minimum size.

In accordance with the present invention, there is provided a gas-liquid separator having an upper region through which incoming gas flows and a lower region in which liquid condensate collects. A screen is provided between the gas inlet and the maximum level to which separated condensate may rise to shield the condensate from gas flow forces. A second screen is provided between the inlet and the outlet such as to produce a slight pressure drop across the screen to equalize the particle velocities of the entire gas stream and to distribute the gas flow uniformly across the stream.

In a further aspect of the invention a transverse gas seal baffle is provided below the first screen. Further, a third screen preferably overlays a portion of the first screen.

For a complete understanding of the invention and for further objects and advantages thereof, reference may now be had to the following description taken in conjunction with the accompanying drawings in which:

FIGURE 3 is a sectional view of a gas-liquid separator of FIGURE 2 taken along lines 3—3 of FIGURE 2;

Figure 1:
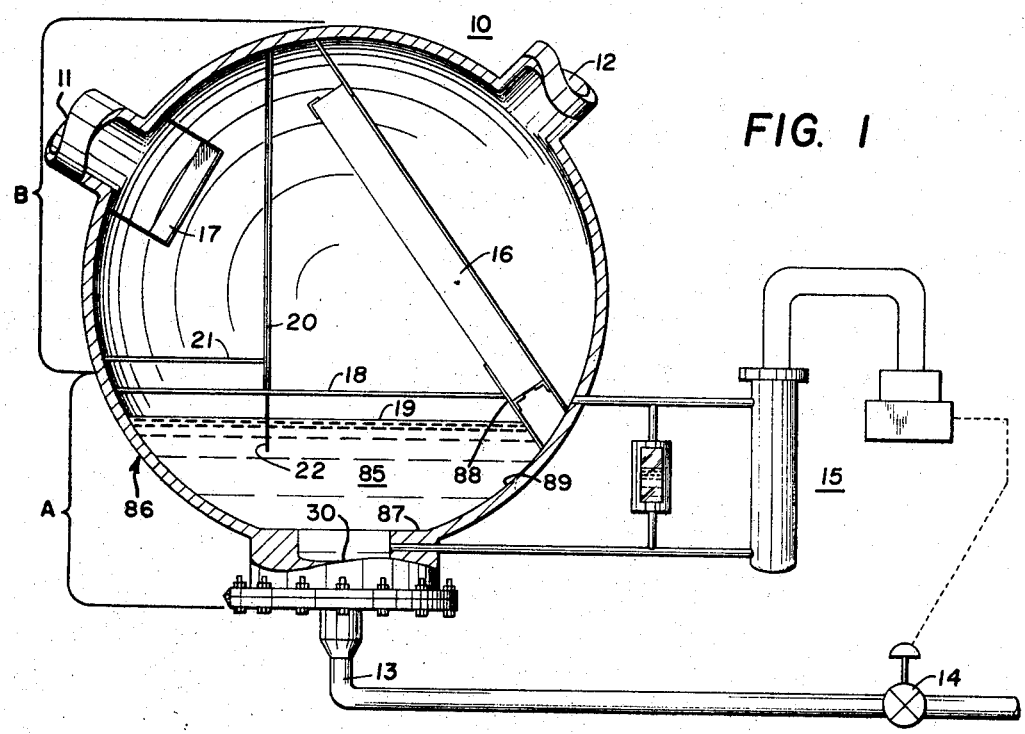
FIGURE 1 is a diagrammatic representation of a gas separator system embodying the present invention.

Referring now to FIGURE 1, a spherical gas-liquid separator 10 has an inlet port 11 and an outlet port 12. The separator operates to provide for the collection of liquid in a lower section with a dump line 13 being controlled by a dump valve 14 which is actuated in a conventional manner by means of a level controller unit 15.

A mist eliminator 16 of either the conventional type or wire mesh type is located in the path of gas flowing to the outlet port 12. Adjacent to the inlet port 11 is a deflector unit 17 which breaks up the laminar flow of gas liquids and condensates entering by way of the port 11.

The elements of the systems thus far described are in general known and have been heretofore employed for extracting liquids entrained in or carried by gas entering the separator 10 by way of the port 11 and leaving by way of port 12. The present invention involves the combination with such system of an arrangement to prevent the re-entrainment of liquid that has been separated from the incoming gas stream. The arrangement further promotes the extraction of liquid particles from the gas stream.

In accordance with the invention, a horizontal screen 18 is provided across the lower portion of the separator 10 immediately above the level 19 of the liquid in the unit. A vertical screen 20 is provided at a point intermediate the inlet 11 and the outlet 12. A secondary horizontal screen 21 is provided immediately above the screen 18 and in front of the screen 20. A solid baffle 22 depends from the screen 18 at about the location of the vertical screen 20. Baffle 22 is of depth to extend below the level 19 of the liquid. By such arrangement the incoming gas and liquids from port 11 as deflected by baffle 17 will be controlled by the screens 18, 20 and 21 and by the baffle 22 so as to prevent re-entrainment of liquid collecting in the bottom of the unit 10.

Figure 2:
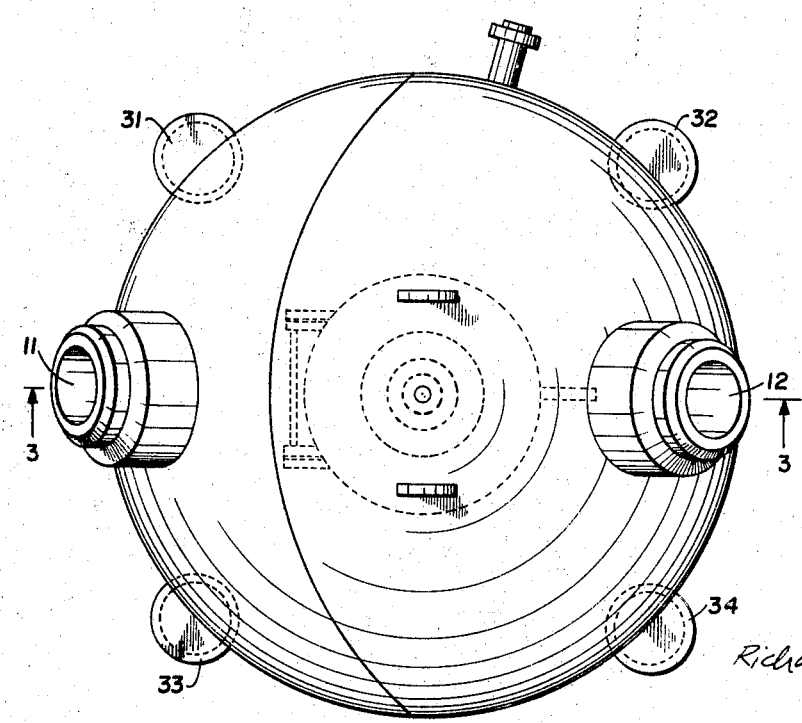
FIGURE 2 is a top view of the separator of FIGURE 1.

One embodiment of the invention has been illustrated in FIGURES 2–7. In FIGURE 2 a top view of the spherical unit 10 has been shown with the inlet port 11 and outlet port 12 extending from an upper portion of the sphere 10. Legs 31–34 are provided to support the sphere.

In FIGURE 3 the system is shown in a sectional view wherein the sphere 10 is provided with welded couplings 11a and 12a for attachment of the inlet and outlet ports 11 and 12. The baffle 17 is mounted immediately in front of the inlet port 11 to deflect incoming gas and liquids toward the walls of the separator 10. The output vane flow controlling unit 16 is mounted in a window in circular plate 37 which extends across the unit 10 immediately in front of the outlet port 12. Plate 37 is canted at an angle of about 55°. A rectangular central window 38 in the plate 37 is occupied by a plurality of vertically oriented vanes, the angles of which may be adjustable in accordance with known procedures for controlling the flow of gas as it approaches the outlet 12. An internal drain 39 is provided to empty any condensate entrapped by the vanes into the lower section of the unit.

The drain line 13 is coupled by way of a hinged cover 40 to a fitting 41 welded into a large opening 30 in the bottom of the unit 10. The opening 30 is large enough to admit entry of fabricator or serviceman to make the necessary interior installations and make corrections when service is necessary. The hinged unit 40 is mounted by a hinge 42 and is provided with an O-ring gasket 43 to maintain a pressure seal.

Figure 4:
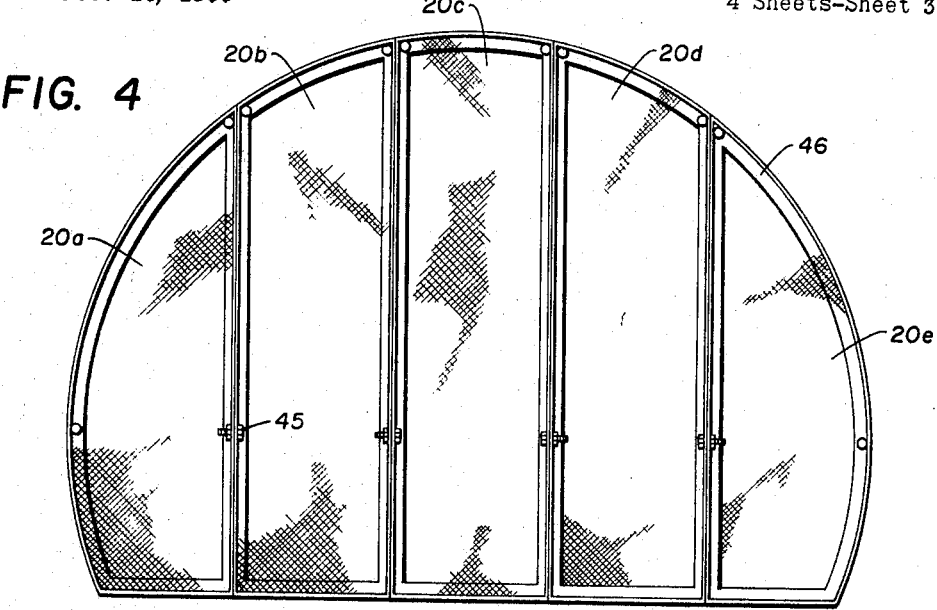
FIGURE 4 is a front view of the vertical screen of the system shown in FIGURE 3.

As indicated in FIGURE 3 and shown in detail in FIGURE 4, the vertical screen 20 is formed of a plurality of sections 20a–20e. The sections are of such width that they can be inserted into the unit through the bottom opening 30 to be assembled inside the unit. Once inside they are coupled together by bolts 45. The screen 20 is then secured inside the unit 10 by bolting it to a mounting ring 46 which is secured to the inner surface of unit 10 by welding along its periphery.

Figure 5:
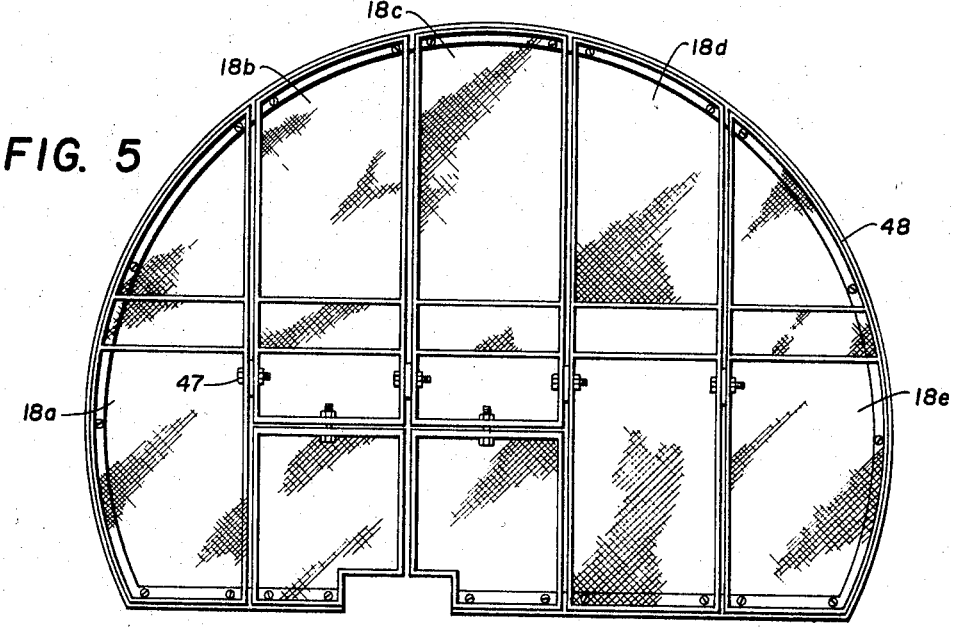
FIGURE 5 is a top view of the lower horizontal screen of FIGURE 3.

As indicated in FIGURE 3 and shown in detail in FIGURE 5, the horizontal screen 18 is formed of a plurality of sections 18a–18e. Also assembled inside the unit 10, sections 18a–18e are secured together by bolts 47. Then screen 18 is bolted to a mounting ring 48 which is secured to the inner surface of the unit 10 by welding it along its periphery.

Figure 7:
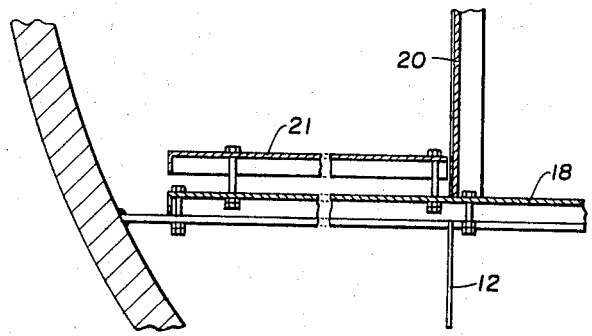
FIGURE 7 is a detailed sectional view of a portion of the screens of FIGURE 3.

As indicated in FIGURE 3 and shown in detail in FIGURE 7, vertical screen 20 is bolted at its bottom to screen 18 and to baffle 22.

Figure 6:
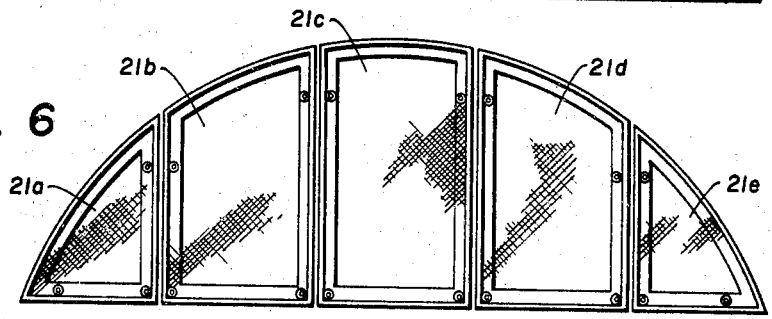
FIGURE 6 is a top view of the upper horizontal screen of FIGURE 3.

As indicated in FIGURE 3 and shown in detail in FIGURE 6, an upper horizontal screen 21 is comprised of a plurality of sections 21a–21e. These sections are of such width that they can be inserted into the unit 10 through the bottom opening 30 and assembled inside the unit. Unlike screen 18 and screen 20, the sections of screen 21 are not interconnected and are not directly secured to a mounting ring. Each screen section is directly secured by bolts 50 to the screen 18.

As indicated in FIGURE 3, a solid baffle plate 22 depends from the screen 18 at about the location of the vertical screen 20. Plate 22 is of depth sufficient to extend below the level 19 of the liquid.

In operation, a stream entering the gas-liquid separator through inlet port 11 is deflected from its path by deflector unit 17. The deflected stream retains laminar flow, but its velocity is considerably reduced. The velocity of the periphery of the deflected stream is lower than the velocity of the center stream, so that center stream carries a larger amount of entrained particles. At the lower velocity, the heavier particles entrained in the stream periphery gravitate toward secondary horizontal screen 21 and the lower regions of vertical screen 20, where they are entrapped and condense to fall into the bottom of the sphere. There a liquid condensate pool forms which may be drained from the separator when it reaches a predetermined level.

Horizontal screen 18 also provides a surface for entrapping particles which fail to reach vertical screen 20.

The principal function of vertical screen 20 is to slow the velocity of the faster moving center stream to that of the periphery of the diverted stream. Thus, particles entrained in the faster moving center stream, if not entrapped by vertical screen 20, have their speed reduced to equal that of the outer laminae of the gaseous stream and precipitate to horizontal screen 18 along a linear path essentially equivalent to that of the particles entrapped in the outer laminae. Vertical screen 20, by equalizing the flow velocities of the inner and outer laminae of the gaseous stream, also quiets the turbulence which tends to exist within cylindrical or spherical gas-liquid separators. This feature in turns aids the horizontal screen 18 in preventing re-entrainment of condensate standing in the bottom of the separator.

Horizontal screen 18 overlies the surface of the separated condensate to prevent the condensate from being whipped up into the overflowing gas stream. Secondarily, it provides a surface to entrap mist particles falling from the uniformly flowing gas stream passing above it.

The solid baffle 22 prevents the gas from flowing under vertical screen 20. Influent gas, therefore, must pass through vertical screen 20 in order to leave the separator sphere.

Figure 8:
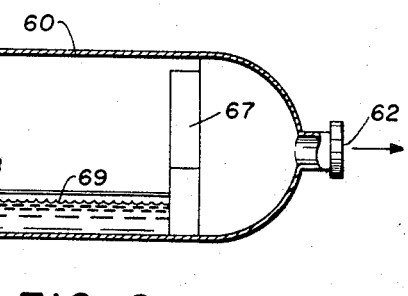
FIGURE 8 is a further modification of the invention.

Referring now to FIGURE 8, a further modification of the invention is shown. A hoizontally disposed cylindrical gas-liquid separator 60 has an inlet port 61 and an outlet port 62. As in the spherical separator, the separator operates to provide for the collection of liquid in a lower lower section. The liquid is dumped by line 63 which is controlled by a dump valve 64 that is actuated in a conventional manner by means of a level controller unit 65.

A deflector unit 66 is attached adjacent to the inlet port 61 to reduce the velocity of the mist stream entering inlet 61. A mist eliminator 67 of either the vane type or the wire mesh type is located in the path of gas flowing to the outlet port 62. As has been mentioned, deflectors and mist eliminating means interposed between a gas inlet and a gas outlet in a gas-liquid separator are generally known to the art.

In this embodiment of the present invention, a horizontal screen 68 is provided above the level 69 of the liquid in the unit and below the level of the gas inlet port 66. A vertical screen 70 is positioned between inlet port 66 and outlet port 62 ahead of mist eliminating means 67. A secondary horizontal screen 72 is provided between horizontal screen 68 and gas inlet port 66 and ahead of vertical screen 70. A solid baffle 74 is mounted below horizontal screen 68 in line with vertical screen 70. The arrangement of the elements of the invention causes precipitation of particles entrained in both the inner and outer laminae of the mist stream, and also shields the separated liquid condensate from forces produced by the gas flow which would otherwise serve to re-entrain the condensate.

Figure 9:
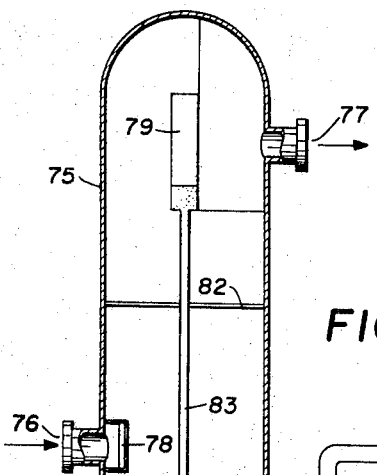
FIGURE 9 is a further modification of this invention.

Another embodiment of the invention has been illustrated in FIGURE 9. In FIGURE 9 a sectional elevation view of a vertically disposed cylindrical gas-liquid separator 75 has been shown. Inlet port 76 is disposed in the lower portion and outlet port 77 extends from the upper portion of the cylinder 75. Conventional dumping means are again provided for the liquid collecting in the lower section of the cylinder 75. Adjacent the inlet port is a deflector unit 78, and interposed in the path of gas flowing through the outlet port 77 is mist eliminator 79. Again, these are all conventional elements of a gas-liquid separator.

In accordance with the present invention, a lower horizontal screen is disposed across the bottom of the separator intermediate the inlet port and the predetermined level of the liquid condensate to shield the surface of the condensate from the gas flowing over it. Interposed between the gas inlet port 76 and the horizontal screen 80 is secondary horizontal screen 81, which in this embodiment provides the principal condensation surface for the gravid particles entrained in the slower moving elements of the gas stream. A third horizontal screen 82 is provided between the gas inlet port 78 and the gas outlet port 77 ahead of mist eliminating means 79. The function of this screen is to equalize the velocities of the stream laminae impinging on mist eliminating means 79. Thus, mist eliminating means 79 is able to operate without channeling, and is accordingly made more efficient. Depending from mist eliminating means 79 through horizontal screens 82, 81 and 80 into the condensate collecting area of separator 75 is drain line 83. By drain line 83, the mist eliminator 79 is drained of condensate which has collected on its surfaces.

By way of summary and further illustration, the invention, using the form shown in FIGS. 1–7, inclusive, as exemplary, comprises a gas-liquid separator 10, comprising a lower section (bracket A, FIG. 1) and an upper section (bracket B, FIG. 1).

The gas with liquid entrapped therewith enters a gas inlet 11 and flows out a gas outlet 12 with substantially all of the liquid content having been removed from the gas prior to its exit.

The lower section (bracket A, FIG. 1) includes a reservoir 85 comprised of a lower member 86 which provides a substantially horizontally extending means 87 with a liquid outlet opening 30 therein. A dump line 13 communicates upwardly with the liquid outlet opening 30; the control valve or dump valve 14 in the dump line 13 being controlled by the controller unit 15, thus to maintain the liquid in the reservoir 85 at a predetermined level 19, as aforesaid.

The lower member 86 extends upwardly as a wall means 89 (including portion 88) to join the upper section (bracket B) and to form or define the basin or limits of the reservoir 85. The primary, substantially horizontally disposed screen 18 extends within and across the lower section (bracket A) at an elevation adjacent the top of the aforesaid lower section, the screen 18 abutting the wall means 89 all around (including portion 88 comprising part of the lower frame part that carries the mist eliminator 16).

The upper section (bracket B) extends upwardly from, and above the wall means 89 and encloses the gas-liquid separator 10 as a pressure vessel. A deflector unit or deflector 17, disposed inwardly from the gas inlet 11, is disposed to direct at least a portion of the entering gas downwardly, with liquid entrained therewith. A second mesh screen 20 is bordered by contact with the inner surface 90 of the pressure vessel, including its upper section (bracket B) at a point or along a contact line between the deflector 17 and the gas outlet 12, or more immediately, the mist extractor 16. The screen 20 extends substantially downwardly into contact with the primary screen 18, and downwardly deflected gas passes through the second screen 20 and on toward the outlet 12.

A baffle 22 extends between, or has its opposed ends bounded by the wall means 89 with its upper edge in contact with the screen 18 under the lower edge of the screen 20. The baffle 22 extends to a point or elevation below the predetermined liquid level 19 and thus gas that is deflected downwardly from the deflector 17 to pass with entrained liquid through and below the screen 18, with some impelled down into the liquid in the reservoir 85, must then return up through the liquid on the left side of the baffle 22, FIG. 1, and pass above the screen 18 and on to the right through the screen 20 on its way to the outlet 12.

The portion of the primary screen 18 to the right of the second screen 20, or between the second screen 20 and the outlet 12 (more immediately the mist eliminator 16), serves to entrain any liquid drawn upwardly from the liquid level 19 by turbulence, and thus a relatively high percentage of pure gas passes out the outlet 12.

What is claimed is:

1. A gas-liquid separator comprising: a lower section in which liquid accumulates to a predetermined level; an upper section having a gas inlet and a gas outlet; the gas flowing through said upper section from said inlet to said outlet;
  (a) a reservoir in said lower section and comprising,
  (b) a lower member providing lowermost substantially horizontally extending means including a liquid outlet opening therein,
  (c) a liquid level control means maintaining liquid in said reservoir at a predetermined level therein,
  (d) a control valve in a liquid discharge means extending downwardly from said liquid outlet opening and controlled by said control means,
  (e) wall means extending upwardly from said lower member and defining therewith said reservoir,
  (f) a primary, substantially horizontally disposed mesh screen extending within and across said lower section adjacent the top thereof and in abutment with said wall means continuously therearound,
  (g) said upper section extending upwardly from, and above said wall means and enclosing said separator as a pressure vessel,
  (h) a deflector disposed inwardly from said inlet and directing at least a portion of the entering gas downwardly with liquid entrained therewith,
  (i) a second mesh screen contacting and extending from the upper, inner surface of said upper section at a point between said deflector and said outlet substantially downwardly into contact with said primary screen for downwardly deflected gas to pass therethrough toward said outlet, said lower section also including
  (j) a baffle extending between said wall means and in contact with and downwardly from said primary screen below said second mesh screen and to a point below said predetermined level into said liquid to direct downwardly deflected gas to pass back up through the said primary screen and thence through said second screen and on to said outlet,
  (k) the portion of said primary screen between said second screen and said outlet serving to entrain any liquid drawn upwardly by turbulence from said liquid level, whereby a relatively high percentage of pure gas passes out said outlet.

2. The combination as set forth in claim 1, which additionally includes a third screen, said third screen being a secondary, substantially horizontally disposed screen located between said inlet and said primary screen to strip mist entrained in the gas downwardly directed by said deflector.

3. The combination as set forth in claim 1, in which said lower section and said upper section combine to form a spherically shaped pressure vessel.

4. The combination as set forth in claim 1, in which said lower section and said upper section combine in forming a cylindrically shaped pressure vessel.

5. The combination as set forth in claim 1, in which said lower section and said upper section combine in forming a cylindrically shaped pressure vessel with a horizontally extending longitudinal axis.

6. The combination as set forth in claim 1, in which said lower section and said upper section combine in forming a cylindrically shaped pressure vessel with a vertically extending axis.

7. The combination as set forth in claim 1 in which a mist eliminator is interposed in the gas flow path between said second screen and said outlet.

References Cited

UNITED STATES PATENTS

| 492,081 | 2/1893 | Wright | 55—424 |
| 560,420 | 5/1896 | McDonald | 55—421 |

(Other references on following page)

UNITED STATES PATENTS

| | | | |
|---|---|---|---|
| 1,670,660 | 5/1928 | Haase et al. | 55—246 X |
| 1,994,766 | 3/1935 | Heglar | 55—246 X |
| 2,235,892 | 3/1941 | Kuhner | 55—424 |
| 2,485,767 | 10/1949 | Patterson | 55—321 X |
| 2,678,699 | 5/1954 | Fowler | 55—173 X |
| 2,777,533 | 1/1957 | Segrest | 55—173 X |
| 2,882,994 | 4/1959 | Lovelady et al. | 55—173 |
| 2,910,136 | 10/1959 | Valliant et al. | 55—320 X |
| 3,009,536 | 11/1961 | Glasgow | 55—174 X |

FOREIGN PATENTS 449,157  6/1949  Italy.

HARRY B. THORNTON, Primary Examiner

DENNIS E. TALBERT, Jr., Assistant Examiner

U.S. Cl. X.R.

55—320, 355, 423, 424, 434, 462, 483, 511; 137—395; 220—18